United States Patent

Otsuki

(10) Patent No.: US 6,462,112 B2
(45) Date of Patent: Oct. 8, 2002

(54) FLAME-RETARDED ACRYLONITRILE-BUTADIENE-STYRENE RESIN

(75) Inventor: Katsuichi Otsuki, Handa (JP)

(73) Assignee: Daihachi Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 09/886,276

(22) Filed: Jun. 22, 2001

(65) Prior Publication Data

US 2001/0049407 A1 Dec. 6, 2001

Related U.S. Application Data

(63) Continuation of application No. 09/219,883, filed on Dec. 24, 1998, now abandoned.

(30) Foreign Application Priority Data

Apr. 1, 1998 (JP) .............................. 10-088831
Jun. 10, 1998 (JP) .............................. 10-162229

(51) Int. Cl.⁷ .............................................. C08K 5/521
(52) U.S. Cl. ......................... 524/124; 524/1; 524/140; 524/141; 524/150; 524/151
(58) Field of Search ................. 524/127, 140, 524/141, 128, 150, 151

(56) References Cited

U.S. PATENT DOCUMENTS

| | | | |
|---|---|---|---|
| 4,526,917 A | * 7/1985 | Axelrod | 524/141 |
| 4,632,946 A | * 12/1986 | Muench et al. | 524/100 |
| 5,290,836 A | 3/1994 | Truyen | |
| 5,455,292 A | 10/1995 | Kakegawa et al. | |
| 5,605,962 A | 2/1997 | Suzuki et al. | |
| 5,643,981 A | 7/1997 | Yang et al. | |
| 5,672,645 A | * 9/1997 | Eckel et al. | 524/127 |
| 5,969,016 A | * 10/1999 | Weber et al. | 524/127 |
| 5,994,433 A | 11/1999 | Kobayashi et al. | |
| 6,066,686 A | * 5/2000 | Katayama et al. | 524/127 |

FOREIGN PATENT DOCUMENTS

| | | |
|---|---|---|
| EP | 192214 | 8/1986 |
| EP | 0522653 | 1/1993 |
| EP | 538950 | 4/1993 |
| EP | 612806 | 8/1994 |
| JP | 61291644 | 12/1986 |
| JP | 5001079 | 1/1993 |
| JP | 6248160 | 9/1994 |
| JP | 7048491 | 2/1995 |

OTHER PUBLICATIONS

English Language Abstract of JP–61–291644.
English Language Abstract of JP–6–248160.
English Language Abstract of JP–7–48491.
English Language Abstract of JP–5–1079.

* cited by examiner

*Primary Examiner*—Peter Szekely
(74) *Attorney, Agent, or Firm*—Greenblum & Bernstein, P.L.C.

(57) ABSTRACT

A flame-retarded resin composition contains: (A) an ABS resin; (B) an aromatic phosphate having a melting point of 80° C. or more and being represented by the following general formula (I):

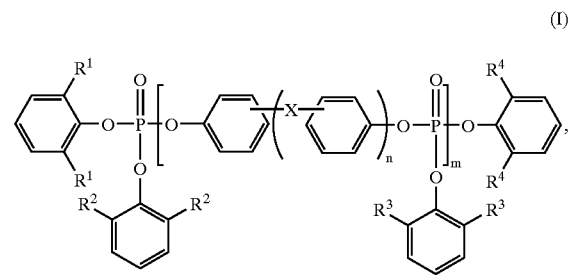

wherein $R^1$ to $R^4$ are, the same or different, a hydrogen atom or an alkyl group having 1 to 3 carbon atoms, excluding the case where $R^1$ to $R^4$ are all hydrogen atoms; X is a bond, $-CH_2-$, $-C(CH_3)_2-$, $-S-$, $-SO_2-$, $-O-$, $-CO-$ or $-N=N-$; n is an integer of 0 or 1; and m is an integer of 0 to 5; and (C) a novolak-type phenolic resin.

30 Claims, No Drawings

FLAME-RETARDED ACRYLONITRILE-BUTADIENE-STYRENE RESIN

CROSS-REFERENCES TO RELATED APPLICATIONS

This application is a continuation of application Ser. No. 09/219,883, filed Dec. 24, 1998 now abandoned. The entire disclosure of application Ser. No. 09/219,883 is considered as being part of the disclosure of this application, and the entire disclosure of application Ser. No. 09/219,883 is expressly incorporated by reference herein in its entirety. This application is related to Japanese patent applications No. HEI 10-088831 filed on Apr. 1, 1998 and No. HEI 10-162229 filed on Jun. 10, 1998, whose priority is claimed under 35 USC § 119, the disclosure of which is incorporated herein by reference in its entirety.

BACKGROUND OF THE INVENTION

1. Field of the Invention

The present invention relates to a novel flame-retarded resin composition, and more particularly to a flame-retarded ABS resin composition which does not generate a corrosive or poisonous gas by decomposition of the resin composition at the time of molding or burning, and which has a good processing property to produce a molded article having a high flame retardancy, good mechanical properties and a resistance to hydrolysis.

2. Description of the Related Art

Thermoplastic resins have excellent properties in that they can be manufactured at a comparatively low cost and they can be easily molded, so that they are used in every field of industry. Especially, ABS resins have excellent mechanical properties, heat resistance, processing property and the like, so that ABS resins are widely used for electric and electronic components, automobile components or the like. However, the thermoplastic resins are generally flammable and, for their use, it is necessary to make the resins flame-retarded by adding a flame-retarder or a flame-retarded auxiliary to the thermoplastic resins. In recent years, more excellent properties (flame retardancy, mechanical properties, heat resistance, electrical insulating property and the like) are sought for in accordance with the diversification of use or increase in scale of the thermoplastic resins.

In order to give flame-retardancy to thermoplastic resins, there has been adopted a method of adding a halogen-type flame-retarder in preparing resin compositions. However, this halogen-type flame-retarder, while giving a flame-retardancy to resins, may possibly generate a hydrogen halide by thermal decomposition at the time of molding to corrode a metal part in a metal mold, molding machine, peripheral apparatus, electric and electronic component or the like. A method for collecting such a corrosive gas can be considered. However, it requires a special equipment. Also, a lot of smoke is generated at the time of burning, and, since the hydrogen halide is poisonous, it not only degrades a working environment but also produces adverse effects on human beings at the time of burning such as a fire. Therefore, in recent years, non-halogen-type flame-retarders are used in many cases.

As the non-halogen-type flame-retarders, inorganic metal compounds such as magnesium hydroxide, aluminum hydroxide, calcium hydroxide or basic magnesium carbonate are used. Especially, magnesium hydroxide has a high temperature of decomposition accompanied by dehydration and is excellent in preventing the generation of smoke at the time of burning, so that magnesium hydroxide is widely used for practical applications. However, in order to produce a sufficient flame-retarded effect, magnesium hydroxide must be added at a large amount and it considerably decreases the inherent properties of the resins, especially the mechanical properties.

As the non-halogen-type flame-retarders other than inorganic metal compounds, organic phosphorus compounds are widely used. Representative organic phosphorus compounds include low molecular weight phosphates such as trimethyl phosphate and triphenyl phosphate.

Japanese Unexamined Patent Publication No. SHO 61(1986)-291644 discloses that flame retardancy can be given to ABS resins by adding a resol-type phenolic resin and red phosphorus to the resins.

Also, Japanese Unexamined Patent Publications No. HEI 6(1994)-248160 and No. HEI 7(1995)-48491 disclose a technique for giving flame retardancy to ABS resins without lowering their impact resistance of the resin, by adding a phenolic resin and an organic phosphorus compound to the resin.

However, the resin compositions disclosed in these Publications have problems in terms of their heat resistance, although they are excellent in flame retardancy and mechanical properties. Especially, it is difficult to use them for purposes that require severe specifications in heat resistance (for example, components that are used in locally heated parts such as an engine part of an automobile or a heat transfer roller of a copying machine).

Moreover, since the organic phosphorus compounds give not only flame retardancy but also plasticity to the resins, there has been a problem that heat deformation temperature or softening temperature of the resins considerably decreases. It is known in the art that the electric property and the flame retardancy of flame-retarded ABS resin compositions are deteriorated by water absorption when the resin compositions are used under severe conditions at a high temperature and high humidity, for example, in various electric and electronic components such as a television set or personal computer, or in automobile components.

SUMMARY OF THE INVENTION

The present invention has been made in view of these circumstances. The present inventors have made an eager research to solve the above-mentioned problems and found out that a resin composition having a high flame retardancy, excellent mechanical properties, heat resistance and hydrolysis resistance in good balance can be produced by adding a specific aromatic phosphate and novolak-type phenolic resin to an ABS resin, thus completing the present invention.

The purpose of the present invention is to provide a flame-retarded ABS resin composition which does not contain a halogen atom and does not generate a corrosive or poisonous gas at the time of molding or burning, which has high flame retardancy and mechanical properties with low volatility, and has excellent resistance to hydrolysis without lowering the electric properties by water absorption or blistering.

Accordingly, the present invention provides a flame-retarded resin composition containing: (A) an ABS resin; (B) an aromatic phosphate having a melting point of 80° C. or more and being represented by the following general formula (I):

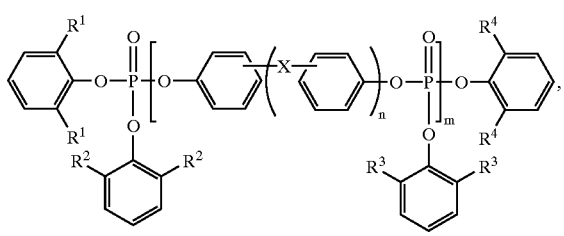

(I)

wherein $R^1$ to $R^4$ are, the same or different, a hydrogen atom or an alkyl group having 1 to 3 carbon atoms, excluding the case where $R^1$ to $R^4$ are all hydrogen atoms; X is a bond, —$CH_2$—, —$C(CH_3)_2$—, —S—, —$SO_2$—, —O—, —CO— or —N=N—; n is an integer of 0 or 1; and m is an integer of 0 to 5; and (C) a novolak-type phenolic resin.

DETAILED DESCRIPTION OF THE PREFERRED EMBODIMENTS

The "ABS resin(s)" of the component (A) to be used in the present invention represents a resin formed from three kinds of monomers, i.e. acrylonitrile, butadiene, and styrene, as principal materials. However, a desired site of the above-mentioned monomers may be substituted with a specific group for improvement of the property of the resin to be produced.

The ABS resins may be specifically 1) a resin obtained by graft copolymerization of an aromatic vinyl compound (such as styrene) and a vinyl monomer (such as acrylonitrile) copolymerizable with the aromatic vinyl compound, to a rubbery polymer (such as polybutadiene or styrene-butadiene copolymer rubber) or 2) a polymer blend obtained by blending a vinyl copolymer (such as styrene-acrylonitrile copolymer) formed from an aromatic vinyl compound and a vinyl monomer copolymerizable with the aromatic vinyl compound, with a rubbery polymer (such as acrylonitrile-butadiene copolymer rubber). Among these two, the latter one is preferable. The ratio of blending the vinyl copolymer and the rubbery polymer in the polymer blend is usually 30 to 40:60 to 70 (wt. %).

The aromatic vinyl compound in the component (A) may be, for example, styrene, α-methylstyrene, or paramethylstyrene. Among these, styrene is particularly preferable.

The vinyl monomer copolymerizable with the aromatic vinyl compound may be alkyl (meth)acrylate such as methyl acrylate, ethyl acrylate or methyl methacrylate; (meth) acrylic acid such as acrylic acid or methacrylic acid; vinyl cyanide monomer such as acrylonitrile or methacrylonitrile; α,β-unsaturated carboxylic acid such as maleic anhydride; maleimide monomer such as N-phenylmaleimide, N-(methylphenyl)maleimide, N-cyclohexylmaleimide or N-methylmaleimide; or glycidyl monomer such as glycidyl (meth)acrylate.

Among the above-mentioned vinyl monomers, alkyl (meth)acrylate, vinyl cyanide monomer (especially acrylonitrile), and maleimide monomer (especially N-phenylmaleimide) are preferable.

The rubbery polymer is not specifically limited as long as it has a glass transition temperature of 0° C. or less. Specifically, the rubbery polymer may be diene-type rubber such as polybutadiene, styrene-butadiene copolymer rubber or acrylonitrile-butadiene copolymer rubber; acrylic rubber such as polybutyl acrylate; block copolymer such as polyisoprene, polychloroprene, ethylene-propylene rubber, ethylene-propylene-diene terpolymer rubber, styrene-butadiene block copolymer rubber or styrene-isoprene block copolymer rubber; or a hydrogenated compound thereof. Here, the rubbery polymer refers to a polymer having a rubber elasticity.

Among the above-mentioned rubbery copolymers, polybutadiene, styrene-butadiene copolymer rubber and acrylonitrile-butadiene copolymer rubber are especially preferable.

The ratio of the aromatic vinyl compound and the vinyl monomer copolymerizable with the aromatic vinyl compound to the rubbery polymer in the graft polymer may be 5 to 70:95 to 30 (wt. %), preferably 10 to 50:50 to 90 (wt. %). If the amount of the aromatic vinyl compound and the vinyl monomer polymerizable with the aromatic vinyl compound is less than 5 wt. %, the rubbery polymer aggregates (the compatibility of the rubbery polymer with the matrix resin decreases), and the surface luster of the resin decreases, so that it is not preferable. If the amount of the aromatic vinyl compound and the vinyl monomer polymerizable with the aromatic vinyl compound exceeds 70 wt. %, adverse effects are produced on the moldability of the resin composition, so that it is not preferable. The rubbery polymer is preferably contained in a range of 50 to 90 wt. % in view of the balance between the impact resistance of the molded article obtained from the resin composition and the processing fluidity.

The ABS resin of the component (A) may contain another resin such as polyacrylate, polybutadiene, polystyrene, polyphenylene ether, polyphenylene sulfide, polycarbonate, polyether sulfone, polyamide, polyimide or polyvinyl chloride at an amount that does not deteriorate the physical properties of the resin composition of the present invention. Among these resins, polyphenylene ether can improve the impact resistance of the resin composition to be obtained.

The component (B) to be used in the present invention is an aromatic phosphate of the general formula (I) which has a specific terminal structure and a melting point of 80° C. or more. Here, the specific terminal structure means that the compound has at least one 2,6-dialkylphenol residue. The alkyl group having 1 to 3 carbon atoms for the substituents $R^1$ to $R^4$ in the general formula (I) may be, for example, methyl, ethyl, n-propyl or iso-propyl.

The aromatic phosphate of the component (B) may be a single one of the above-mentioned aromatic phosphates or a mixture of two or more kinds of these phosphates.

Among the aromatic phosphates of the general formula (I), aromatic phosphates having a specific bonding structure and a terminal structure, and represented by the following general formula (II):

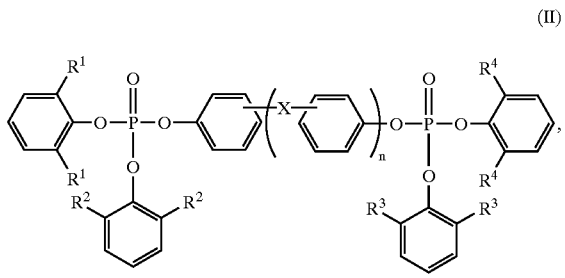

(II)

wherein $R^1$ to $R^4$, X and n have the same meaning as defined in the general formula (I), are preferable. Here, the specific bonding structure refers to a bifunctional phenol residue.

As the bifunctional phenol, resorcin, hydroquinone, 4,4-biphenol, bisphenol A, bisphenol F and bisphenol S are preferable. As the 2,6-dialkylphenol, 2,6-dimethylphenol is preferable. The melting point of the aromatic phosphate is most preferably 95° C. or more in view of heat resistance of the resin to be obtained.

The aromatic phosphate of the general formula (II) can be prepared by allowing the above-mentioned bifunctional phenol and 2,6-dialkylphenol to react in accordance with the method disclosed, for example, in Japanese Unexamined Patent Publication No. HEI 5(1993)-1079.

Among the aromatic phosphates of the general formula (II), aromatic phosphates of the following general formula (III):

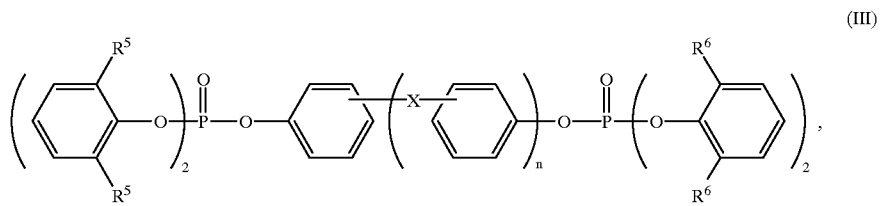

(III)

wherein $R^5$ and $R^6$ are, the same or different, an alkyl group having 1 to 3 carbon atoms, and X and n have the same meaning as defined in the general formula (I), are preferable. Here, the substituents $R^5$ and $R^6$ in the general formula (III) may be, for example, methyl, ethyl, n-propyl, or iso-propyl. Among these, methyl is especially preferable.

Examples of the aromatic phosphates of the general formula (I) include compounds of the following formulas (1) to (6), among which the compound of the formula (1) is especially preferable.

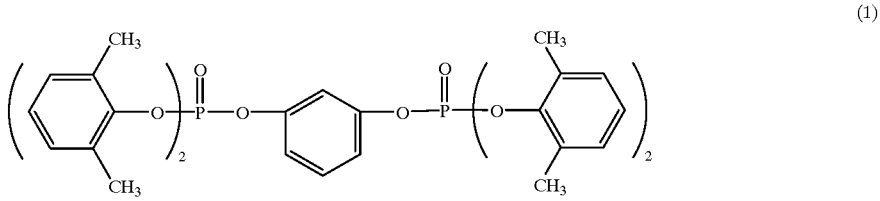

(1)

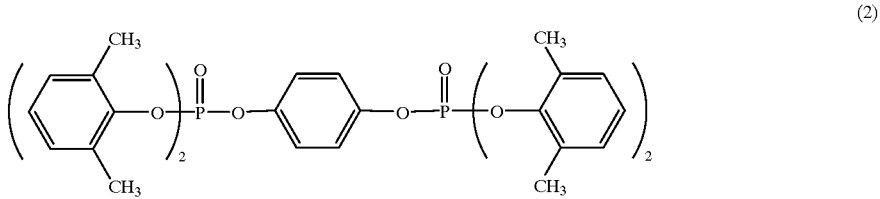

(2)

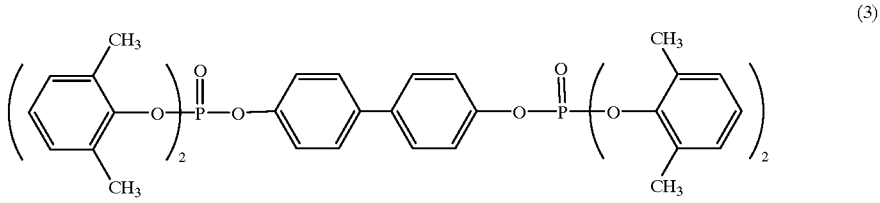

(3)

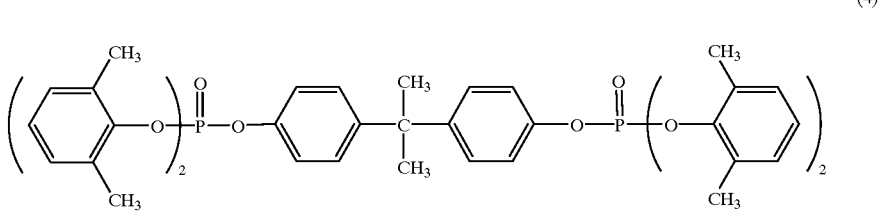

(4)

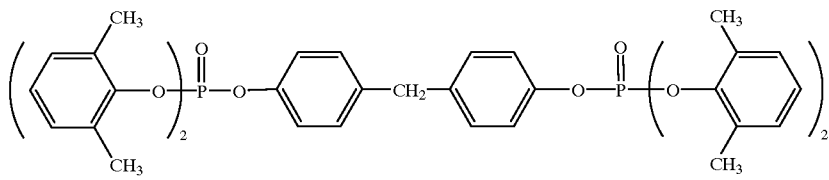

(5)

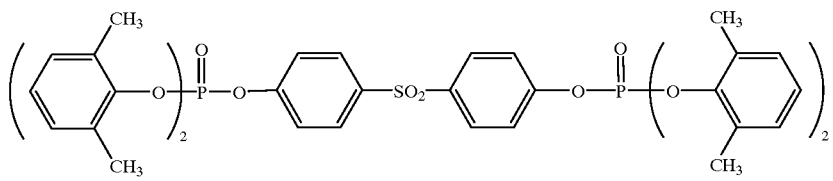

(6)

It is sufficient that the novolak-type phenolic resin of the component (C) to be used in the present invention is a resin that generates a char at the time of burning, and it can be prepared by the condensation reaction of a phenol compound and an aldehyde compound. Specifically, the novolak-type phenolic resin may be, for example, phenol-formaldehyde novolak resin, cresol-formaldehyde novolak resin, xylenol-formaldehyde novolak resin, tert-butylphenol-formaldehyde novolak resin, p-octylphenol-formaldehyde novolak resin, nonylphenol-formaldehyde novolak resin, resorcinol-formaldehyde novolak resin, bisphenol A-formaldehyde novolak resin, p-cyanophenol-formaldehyde novolak resin or a mixture of two or more of these resins. Among these, the phenol-formaldehyde novolak resin is preferable. Also, the molecular weight of the novolak-type phenolic resin is preferably 300 to 10,000.

The blending ratio of the components (A), (B) and (C) in the flame-retarded resin composition of the present invention is preferably 100:3 to 30:3 to 30 (parts by weight).

If the blending amount of the aromatic phosphate of the component (B) is less than 3 parts by weight, a sufficient flame-retardancy cannot be obtained, so that it is not preferable. If the blending amount of the aromatic phosphate is more than 30 parts by weight, the mechanical properties of the molded article to be obtained will decrease and the molded article will have a poor practicability, so that it is not preferable. The blending amount is more preferably 5 to 20, most preferably 10 to 15, parts by weight.

If the blending amount of the phenolic novolak resin of the component (C) is less than 3 parts by weight, a sufficient flame-retardancy cannot be obtained, so that it is not preferable. If the blending amount of the phenolic novolak resin is more than 30 parts by weight, the mechanical properties of the molded article to be obtained will decrease and the molded article will have a poor practicability, so that it is not preferable. The blending amount is more preferably 5 to 20 parts by weight, most preferably 5 to 10 parts by weight.

The flame-retarded resin composition of the present invention may optionally contain one or more of various additives such as other flame-retarders, anti-oxidants, fillers, antistatic agents, reinforcing agents, stabilizers, lubricants, coloring agents, and plasticizers at amounts that do not deteriorate the physical properties of the composition in accordance with the needs.

Examples of the other flame-retarders include non-halogen-type phosphate compounds and inorganic metal compounds.

Examples of the non-halogen-type phosphate compounds include triphenyl phosphate, tricresyl phosphate, trixylyl phosphate, trimethyl phosphate, tributyl phosphate and condensed compounds thereof (for example, CR-741, CR-747 and CR-733S manufactured by Daihachi Chemical Industry Co., Ltd. in Japan).

Examples of the inorganic metal compounds include aluminum hydroxide, magnesium hydroxide and antimony trioxide.

Among the above-mentioned flame-retarders, inorganic metal compounds such as magnesium hydroxide and antimony trioxide are preferable, because these inorganic metal compounds can improve the heat resistance when used in combination with the aromatic phosphate of the component (B) of the present invention.

Examples of the antioxidants include hydroquinone-type compounds, phosphorus-type compounds, phenol-type compounds, amine-type compounds and sulfur-type compounds. Among these, the hydroquinone-type compounds and phosphorus-type compounds are preferable, because they can give an excellent fogging property to the flame-retarded resin composition of the present invention. Here, one of the above-mentioned antioxidants may be used alone, or alternatively two or more kinds of the above-mentioned antioxidants may be used in combination.

Examples of the hydroquinone-type compounds include hydroquinone, 2,5-di-tert-butylhydroquinone, 2,5-di-tert-amylhydroquinone and octylhydroquinone. Among these, 2,5-di-tert-amylhydroquinone is especially preferable, because it can improve the heat resistance of the flame-retarded resin composition.

Examples of the phosphorus-type compounds include trivalent organic phosphorus compounds such as triphenyl phosphate, tris(nonylphenyl) phosphite, diphenyl isodecyl phosphate, bis(2,4-di-tert-butylphenyl)pentaerythritol diphosphite and tetrakis(2,4-di-tert-butylphenyl)4,4-diphenylene phosphonite.

Examples of the fillers include inorganic fillers such as mica, talc and alumina, and organic fillers such as wood powder. Examples of the antistatic agents include cationic antistatic agents and non-ionic antistatic agents.

Examples of the reinforcing agents include glass fibers, metal fibers, and whiskers. Examples of the stabilizers include ultraviolet light absorbers and light stabilizers such as benzophenone-type compounds, salicylate-type compounds, benzotriazole-type compounds and acrylonitrile-type compounds.

Further, examples of the lubricants include fatty acid type compounds and high-melting-point wax-type compounds; and the examples of the coloring agents include pigments such as titanium oxide and phthalocyanine-type compounds.

The flame-retarded resin composition of the present invention can be produced by mixing and melt-kneading the components (A), (B), (C) and, optionally, the above-mentioned various additives by a known method. The mixing and melt-kneading operation can be performed by using a generally-employed apparatus such as a single-screw extruder, twin-screw extruder such as a vent-type twin-screw extruder, Henschel mixer, Banbury mixer, kneader mixer or roll alone or using two or more of them in combination. By molding the resultant flame-retarded resin composition using a known method, a molded article having a desired shape, for example, a board-like, sheet-like or film-like molded article, can be produced.

It seems that, since the flame-retarded resin composition of the present invention uses the aromatic phosphate of the component (B) and the novolak-type phenolic resin of the component (C) in combination as a flame-retarded effective component, an excellent flame-retarded effect can be produced by a synergistic action of these components.

Namely, it is known in the art that the novolak-type phenolic resin gives flame-retardancy to a resin by acting as a char-generating component. Therefore, it seems that the amount of aromatic phosphate to be used can be reduced by using this phenolic resin, and a resin composition having an excellent flame retardancy can be produced without decreasing the inherent mechanical properties of the resin.

EXAMPLES

Hereafter, the present invention will be more specifically explained by way of the following examples, which are not intended to limit the scope of the present invention.

The components used in the Examples and the Comparative Examples are shown hereafter with their abbreviations.

Component (A)
  (a-1) ABS resin (manufactured by Daicel Chemical Industries, Ltd. in Japan, trade name: CEVIAN V)
  (a-2) ABS resin (manufactured by Cheil Industries Inc. in Korea, trade name: STARLIGHT)

Component (B)
  (b-1) the compound of the following formula (1) mp 98 to 101° C.
(manufactured by Daihachi Chemical Industry Co., Ltd., trade name: PX-200)

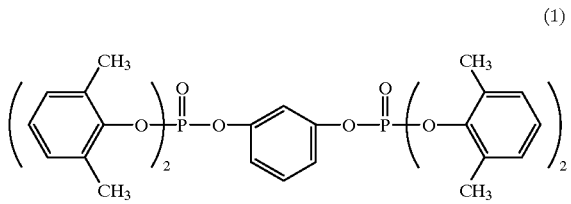
(1)

(b-2) the compound of the following formula (2) mp 171 to 173° C.
(manufactured by Daihachi Chemical Industry Co., Ltd., trade name: PX-201)

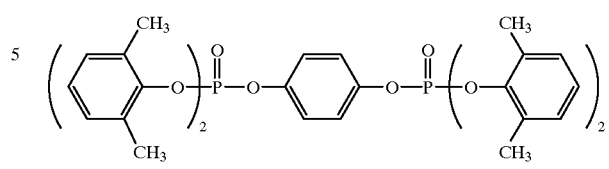
(2)

(b-3) the compound of the following formula (3) mp 187 to 189° C.
(manufactured by Daihachi Chemical Industry Co., Ltd., trade name: PX-202)

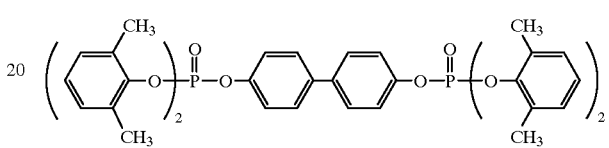
(3)

(b-4) tris(2,6-dimethylphenyl) phosphate mp 136 to 138° C.
(manufactured by Daihachi Chemical Industry Co., Ltd., trade name: PX130)

(b'-1) triphenyl phosphate mp 49 to 50° C.
(manufactured by Daihachi Chemical Industry Co., Ltd., trade name: TPP)

(b'-2) the compound of the following formula, liquid at an ordinary temperature (manufactured by Daihachi Chemical Industry Co., Ltd., trade name: CR-733S)

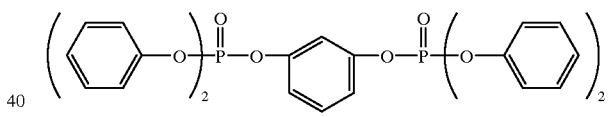

Component (C)
  (c-1) phenol-formaldehyde novolak resin (manufactured by Arakawa Chemical Industry Co., Ltd., trade name: Tamanol-759)

EXAMPLES

Flame-retarded resin compositions were prepared using the components at the blending ratios (parts by weight) shown in Table 1. The components were mixed in a Henschel mixer and were melt-kneaded in a vent-type twin-screw extruder (TEM-37BS manufactured by Toshiba Machine Co., Ltd.) to produce the flame-retarded resin compositions in pellets. Next, the resultant resin compositions were molded in an injection molding machine to produce samples for flame retardancy test and mechanical property measurement.

The physical properties of the resultant resin compositions were evaluated by the following methods.

Flame Retardancy (Examples 1 to 11)
  Oxygen Index (LOI)
    :according to JIS K-7201
Mechanical Properties (Examples 1 to 11)
  Izod Impact Strength
    :according to JIS K-7110

Deflection Temperature Under Load
:according to JIS K-7207

Vicat Softening Point
:according to JIS K-7206

Water Absorption (Example 11)

Boiling Water Absorptivity and Water Absorption Amount
:according to the (A) method of JIS K-7209

However, test pieces having a size of 61.5 mm×12.9 mm×3.1 mm were used and the method (A) (1) and (2) in "8. Calculation" of the above Standard were used as the calculation formulas.

The evaluation results of the obtained flame-retarded resin compositions are shown in Table 1 together with the components of the resin compositions and the blending ratios.

TABLE 1

|  | Examples | | | | | | | | | | |
|---|---|---|---|---|---|---|---|---|---|---|---|
|  | 1 | 2 | 3 | 4 | 5 | 6 | 7 | 8 | 9 | 10 | 11 |
| (A) component | | | | | | | | | | | |
| a-1 | 100 | 100 | | | | | | | | | |
| a-2 | | | 100 | 100 | 100 | 100 | 100 | 100 | 100 | 100 | 100 |
| (B) component | | | | | | | | | | | |
| b-1 | 10 | 13.3 | 10 | 13.3 | | | | | | 7.5 | 15 |
| b-2 | | | | | 10 | 13.3 | | | | | |
| b-3 | | | | | | | 10 | 13.3 | | | |
| b-4 | | | | | | | | | 15 | 7.5 | |
| (C) component | | | | | | | | | | | |
| c-1 | 10 | 6.7 | 10 | 6.7 | 10 | 6.7 | 10 | 6.7 | 5 | 5 | 5 |
| Evaluation result of flame-retarded resin composition | | | | | | | | | | | |
| LOI (%) | 31.1 | 30.7 | 28.9 | 33.3 | 29.4 | 33.8 | 28.1 | 32.5 | 32.5 | 35.5 | 33.8 |
| Izod impact strength | 5.9 | 6.6 | 16.7 | 16.6 | 17.3 | 16.8 | 16.7 | 16.0 | 15.9 | 13.7 | 11.4 |
| Deflection temperature under load (° C.) | 68.9 | 66.2 | 72.0 | 70.5 | 75.0 | 72.8 | 77.8 | 75.2 | 72.6 | 70.3 | 65.8 |
| Vicat softening point (° C.) | 81.3 | 80.1 | 84.0 | 82.0 | 86.8 | 85.1 | 88.5 | 86.2 | 84.8 | 81.5 | 79.5 |
| Water absorption (wt %) | | | | | | | | | | | 0.46 |
| Water absorption per surface area (mg/cm$^2$) | | | | | | | | | | | 0.51 |

COMPARATIVE EXAMPLES

Samples were obtained in the same manner as in the Examples except that the flame-retarded resin compositions were prepared using the components at the blending ratios shown in Table 2. Physical properties of the obtained resin compositions were evaluated in the same manner as in the Examples. The evaluation of flame retardancy and mechanical properties was carried out in Comparative Examples 1 to 8 and the evaluation of water absorption was carried out in Comparative Examples 7 and 8.

The evaluation results of the obtained flame-retarded resin compositions are shown in Table 2 together with the components of the resin compositions and the blending ratios.

TABLE 2

|  | Comparative Examples | | | | | | | |
|---|---|---|---|---|---|---|---|---|
|  | 1 | 2 | 3 | 4 | 5 | 6 | 7 | 8 |
| (A) component | | | | | | | | |
| a-1 | 100 | 100 | | | | | | |
| a-2 | | | 100 | 100 | 100 | 100 | 100 | 100 |
| (B) component | | | | | | | | |
| b'-1 | 10 | 13.3 | 10 | 13.3 | | | 15 | |
| b'-2 | | | | | 10 | 13.3 | | 15 |
| (C) component | | | | | | | | |
| c-1 | 10 | 6.7 | 10 | 6.7 | 10 | 6.7 | 5 | 5 |
| Evaluation result of flame-retarded resin composition | | | | | | | | |
| LOI (%) | 28.9 | 32.5 | 31.1 | 32.9 | 31.6 | 34.6 | 32.5 | 30.3 |
| Izod impact strength | 4.8 | 4.5 | 13.8 | 12.8 | 13.2 | 11.1 | 11.2 | 8.9 |
| Deflection temperature under load (° C.) | 58.6 | 55.2 | 61.1 | 59.3 | 65.2 | 62.1 | 58.5 | 61.3 |
| Vicat softening point (° C.) | 70.5 | 67.3 | 72.2 | 69.7 | 75.4 | 72.8 | 67.8 | 71.2 |
| Water absorption (wt %) | | | | | | | 0.50 | 0.51 |
| Water absorption per surface area (mg/cm$^2$) | | | | | | | 0.64 | 0.65 |

As shown above, since the flame-retarded resin composition of the present invention is prepared by adding a specific aromatic phosphate and a novolak-type phenolic resin to an ABS resin, the present invention can provide a flame-retarded ABS resin composition which does not contain a halogen atom and does not generate a corrosive or poisonous gas at the time of molding or burning, which has low volatility and high flame retardancy and mechanical properties, and which has excellent resistance to hydrolysis without lowering the electric properties by water absorption or blistering.

Therefore, the flame-retarded resin composition of the present invention can be used under severe conditions at a high temperature and high humidity, for example, in various electric and electronic components such as a television set or personal computer, or in automobile components.

Also, since the flame-retarded resin composition of the present invention does not contain a halogen atom, the flame-retarded resin composition causes substantially no safety problems in terms of poisonousness to human beings or corrosiveness to molding apparatus.

Although the present invention has fully been described by way of examples, it is to be understood that various changes and modifications will be apparent to those skilled in the art. Therefore, unless otherwise such changes and modifications depart from the scope of the invention, they should be construed as being included therein.

What is claimed is:

1. A flame-retarded Acrylonitrile-Butadiene-Styrene (ABS) resin composition comprising:
    ABS resin;
    aromatic phosphate having a melting point of 80° C. or more and being represented by the following general formula (I):

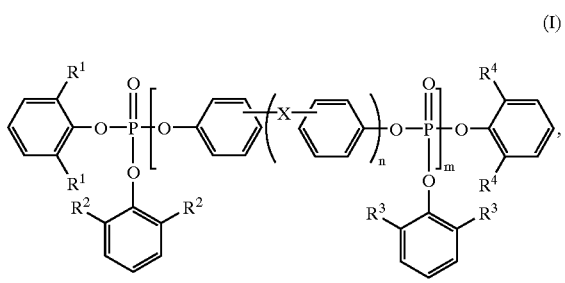

(I)

wherein $R^1$ to $R^4$ are, the same or different, hydrogen or alkyl having 1 to 3 carbon atoms, with the proviso that $R^1$ to $R^4$ cannot all be hydrogen; X is a bond, —CH$_2$—, —S—, —CO— or —N=N—; n is an integer of 0 or 1; and m is an integer of 0 to 5; and
novolak phenolic resin.

2. The flame-retarded resin composition of claim 1 wherein n is 1.

3. The flame-retarded resin composition of claim 1 wherein the ABS resin, the aromatic phosphate and the novolak phenolic resin are blended in a ratio of 100:3 to 30:3 to 30 parts by weight.

4. The flame-retarded resin composition of claim 1, wherein the ABS resin, the aromatic phosphate and the novolak phenolic resin are blended in a ratio of 100:5 to 20:5 to 20 parts by weight.

5. The flame-retarded resin composition of claim 1, wherein the ABS resin, the aromatic phosphate and the novolak phenolic resin are blended in a ratio of 100:10 to 15:5 to 10 parts by weight.

6. The flame-retarded ABS resin composition of claim 1, wherein the aromatic phosphate of the general formula (I) is a compound represented by the following general formula (II):

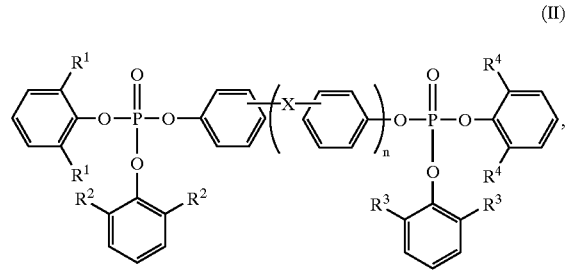

(II)

wherein $R^1$ to $R^4$, X and n have the same meaning as defined in the general formula (I).

7. The flame-retarded ABS resin composition of claim 6, wherein the aromatic phosphate of the general formula (II) is a compound represented by the following general formula (III):

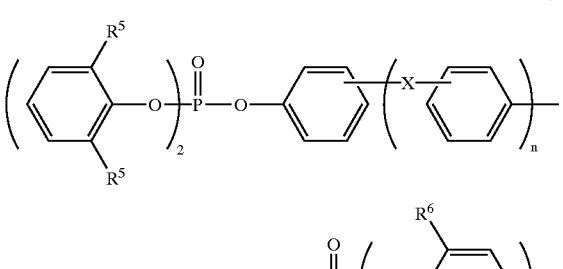

(III)

wherein $R^5$ to $R^6$ are, the same or different, an alkyl group having 1 to 3 carbon atoms, and X and n have the same meaning as defined in the general formula (I).

8. The flame-retarded ABS resin composition of claim 7, wherein $R^5$ and $R^6$ in the general formula (III) are each a methyl group.

9. The flame-retarded resin composition of claim 6 wherein n is 1.

10. The flame-retarded resin composition of claim 7 wherein n is 1.

11. The flame-retarded resin composition of claim 6, wherein the aromatic phosphate has the following formula:

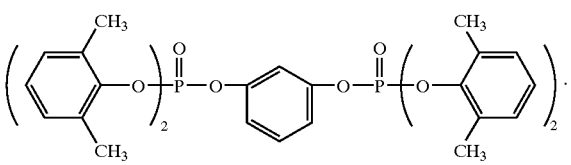

12. The flame-retarded resin composition of claim 6, wherein the aromatic phosphate has the following formula:

13. The flame-retarded resin composition of claim 6, wherein the aromatic phosphate has the following formula:

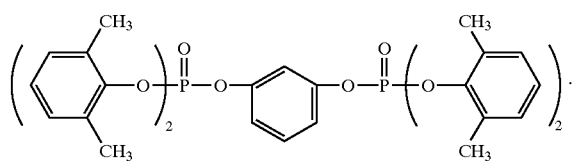

14. The flame-retarded resin composition of claim 6, wherein the aromatic phosphate has the following formula:

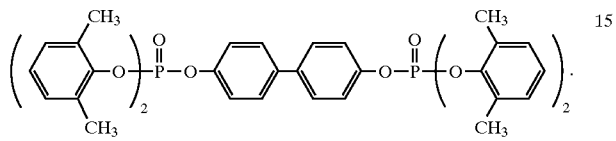

15. The flame-retarded resin composition of claim 6, wherein the aromatic phosphate has the following formula:

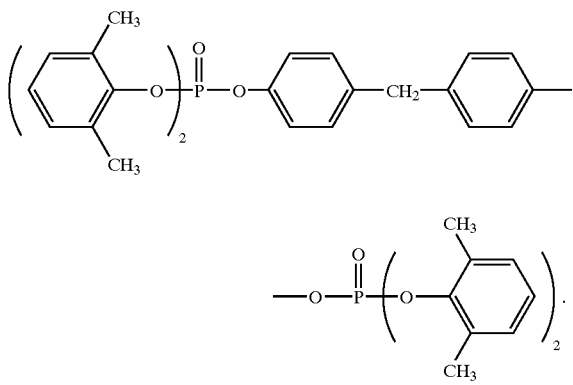

16. A method for making a flame-retarded Acrylonitrile-Butadiene-Styrene (ABS) resin composition comprising blending aromatic phosphate into ABS resin, the aromatic phosphate having a melting point of 80° C. or more and being represented by the following general formula (I):

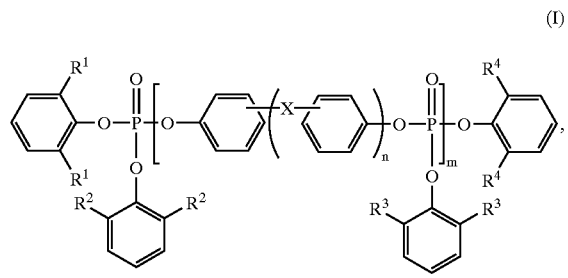

wherein $R^1$ to $R^4$ are, the same or different, hydrogen or alkyl having 1 to 3 carbon atoms, with the proviso that $R^1$ to $R^4$ cannot all be hydrogen; X is a bond, —$CH_2$, —S—, —CO— or —N=N—; n is an integer of 0 or 1; and m is an integer of 0 to 5; and blending novolak phenolic resin into the ABS resin, thereby forming the flame-retarded ABS resin composition.

17. The method of claim 16 wherein the aromatic phosphate has a blend ratio of 3 to 30 parts by weight to 100 parts by weight of the ABS resin and the novolak phenolic resin has a blend ratio of 3 to 30 parts by weight to 100 parts by weight of the ABS resin.

18. The method of claim 17 wherein the aromatic phosphate has a blend ratio of 5 to 20 parts by weight to 100 parts by weight of the ABS resin and the novolak phenolic resin has a blend ratio of 5 to 20 parts by weight to 100 parts by weight of the ABS resin.

19. The method of claim 18 wherein the aromatic phosphate has a blend ratio of 10 to 15 parts by weight to 100 parts by weight of the ABS resin and the novolak phenolic resin has a blend ratio of 10 to 15 parts by weight to 100 parts by weight of the ABS resin.

20. The method of claim 16 wherein the aromatic phosphate of the general formula (I) is a compound represented by the following general formula (II):

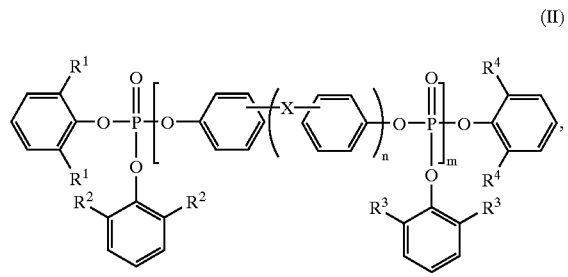

wherein $R^1$ to $R^4$, X and n have the same meaning as defined in the general formula (I).

21. The method of claim 20 wherein the aromatic phosphate of the general formula (II) is a compound represented by the following general formula (III):

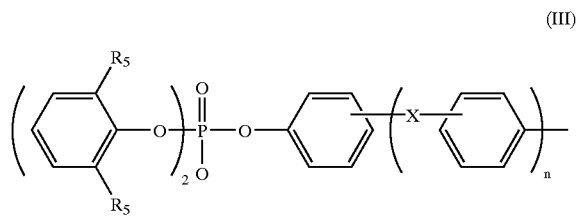

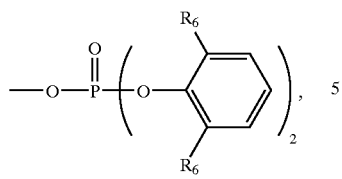

wherein $R^5$ and $R^6$ are, the same or different, alkyl having 1 to 3 carbon atoms, and X and n have the same meaning as defined in the general formula (I).

22. The method of claim 21 wherein $R^5$ and $R^6$ are in the general formula (III) are each methyl.

23. The method of claim 20, wherein the aromatic phosphate has the following formula:

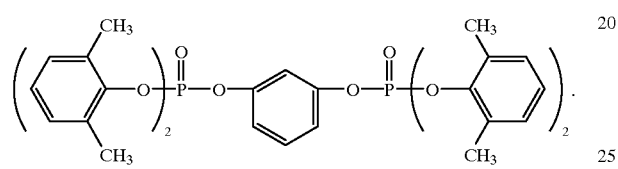

24. The method of claim 20, wherein the aromatic phosphate has the following formula:

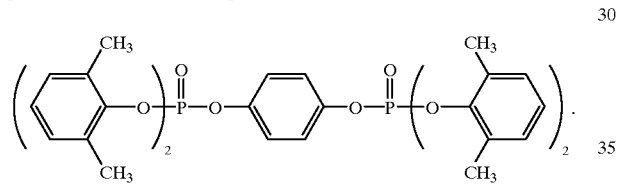

25. The method of claim 20, wherein the aromatic phosphate has the following formula:

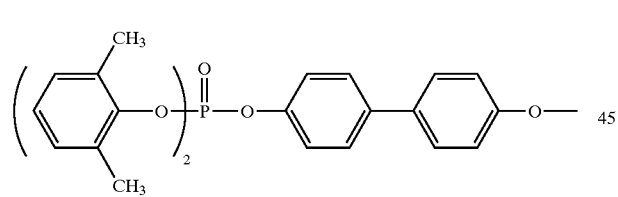

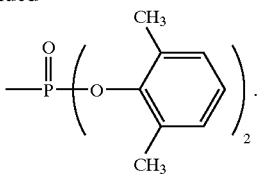

26. The method of claim 20, wherein the aromatic phosphate has the following formula:

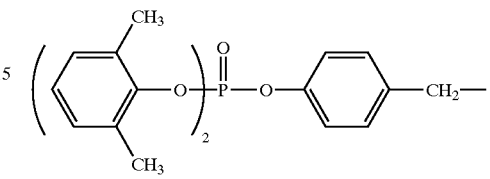

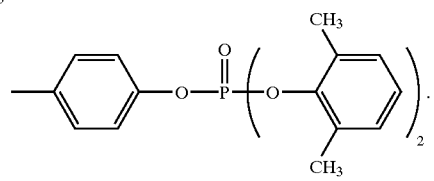

27. The method of claim 20, wherein the aromatic phosphate has the following formula:

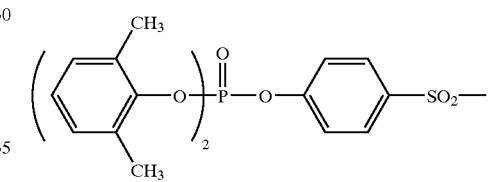

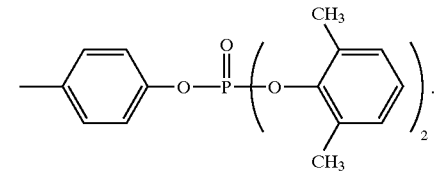

28. The method of claim 16 wherein n is 1.
29. The method of claim 20 wherein n is 1.
30. The method of claim 21 wherein n is 1.

* * * * *

UNITED STATES PATENT AND TRADEMARK OFFICE
CERTIFICATE OF CORRECTION

PATENT NO.   : 6,462,112 B2
DATED        : October 8, 2002
INVENTOR(S)  : K. Otsuki It is certified that error appears in the above-identified patent and that said Letters Patent is hereby corrected as shown below:

Column 16,
Lines 40-50, the formula:

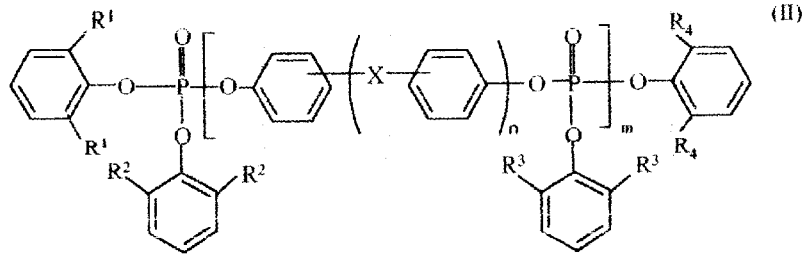

should be:

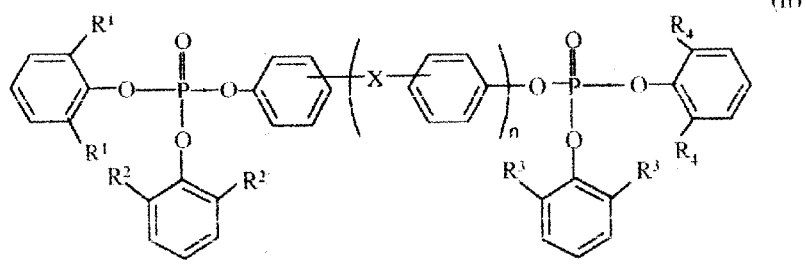

Signed and Sealed this

Fifth Day of August, 2003

JAMES E. ROGAN
*Director of the United States Patent and Trademark Office*